2,229,793

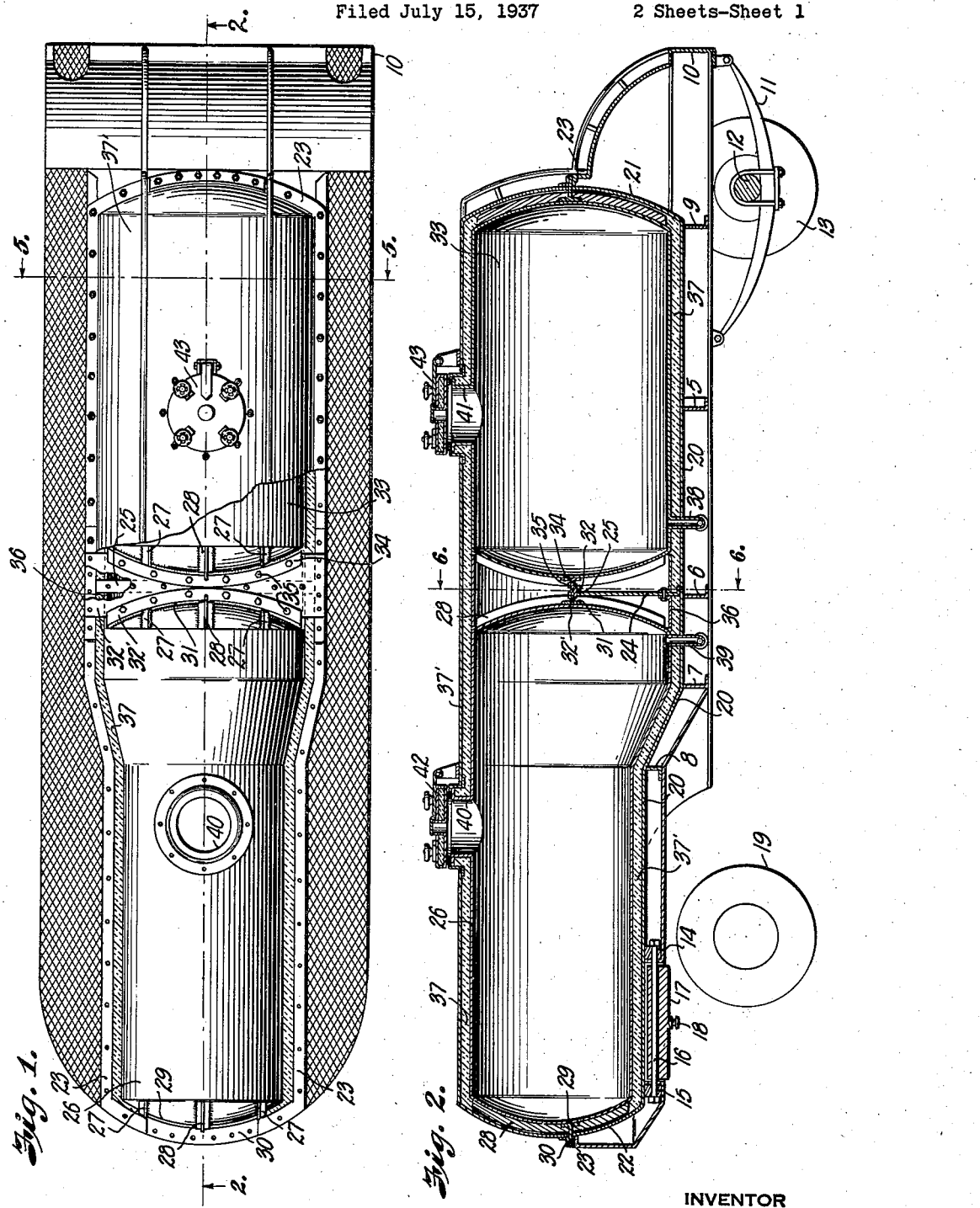
Jan. 28, 1941. R. A. BRADLEY 2,229,793
TRAILER TANK
Filed July 15, 1937 2 Sheets-Sheet 1
INVENTOR
Ralph A. Bradley
BY
ATTORNEY Jan. 28, 1941. R. A. BRADLEY 2,229,793
TRAILER TANK
Filed July 15, 1937 2 Sheets-Sheet 2
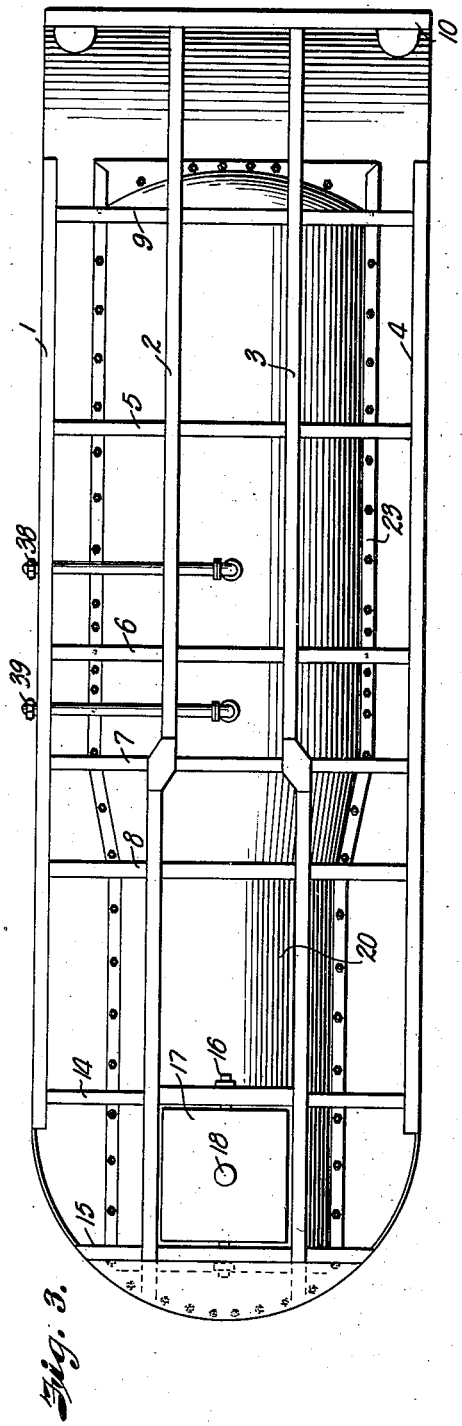
INVENTOR
Ralph A. Bradley
BY
ATTORNEY Patented Jan. 28, 1941

UNITED STATES PATENT OFFICE 2,229,793

TRAILER TANK

Ralph A. Bradley, Kansas City, Mo., assignor to Butler Manufacturing Company, Kansas City, Mo., a corporation of Missouri Application July 15, 1937, Serial No. 153,781

3 Claims. (Cl. 220—1)

My invention relates to trailer tanks and more particularly to a trailer tank adapted to contain liquids for use as food, such as milk, beer, and the like.

In a trailer tank adapted to contain liquid foods such as milk, the tank must be insulated to prevent the heating of the milk, followed by fermentation. Trailer tanks of this character known to the prior art have had the disadvantage of being of excessive weight. The construction has been such that the insulation employed supported the weight of the tank and its contents. This limited the type of insulation which could be used. The mounting was such that the exterior of the tank was practically inaccessible. In order to discharge the liquid from the tanks, it has been customary to employ a pressure type of discharge, that is, air pressure or the like was imposed upon the liquid within the tank to accelerate its discharge from the tank. The pressures employed necessitated the use of tanks of circular cross section, resulting in a construction having a high center of gravity. The outside covering for the insulation had to be seamed. Due to the fact that the seams were made over the insulation, the type of seam was limited in its construction to one which could be so formed. Due to the weight of the prior art constructions, the size of the tank and its capacity was limited. State laws have been passed in most states, limiting the weight and size of trailer vehicles. For a given limit of weight, the greater the weight in the vehicle the less the weight of the useful load.

One object of my invention is to provide a frameless trailer vehicle enabling, by the elimination of the weight of the trailer frame, the hauling of greater pay loads.

Another object of my invention is to provide a trailer tank for comestible liquids in which the container for the liquids is supported independently of the insulation, enabling me to use any type of insulation as for example rock wool or the like which could not be used heretofore, because it is of insufficient strength to support the weight of the tank load.

Another object of my invention is to provide a trailer tank in which the outside of the liquid containing tank of the assembly is readily accessible.

Another object of my invention is to provide a trailer tank assembly of a lower center of gravity.

Another object of my invention is to provide a multiple compartment tank enabling liquids of different character to be hauled by one vehicle.

Other and further objects of my invention will appear from the following description.

In the accompanying drawings which form part of the instant specification and are to be read in conjunction therewith and in which like reference numerals are used to indicate like parts in the various views;

Figure 1 is a plan view of a trailer tank made in accordance with my invention, with part of the insulation and sheathing broken away.

Figure 2 is a sectional view taken on the line 2—2 of Fig. 1.

Figure 3 is a bottom plan view of my assembly.

Figure 4 is a rear elevation of my trailer tank assembly with part of the sheathing and insulation broken away.

Figure 5 is a sectional view taken on the line 5—5 of Figure 1.

Figure 6 is a sectional view taken on the line 6—6 of Figure 2.

In general my invention contemplates the provision of a cradle adapted to be mounted directly on ground wheels at the rear thereof and upon the fifth wheel of a towing vehicle at the front thereof, which cradle is of sufficient strength to act as a frame in and of itself and to support one or a plurality of tanks. The cradle is formed with a stepped portion at its forward end, thus enabling the lowering of the center of gravity of the assembly.

More particularly referring now to the drawings, the cradle comprises a plurality of longitudinal members 1, 2, 3, and 4 of any suitable cross sectional shape such as I's, T's L's or channels. Transverse members 5, 6, 7, 8, 9, 10, 14 and 15 complete the framework of the cradle. The transverse members may be made of a plurality of webs welded to the longitudinal members or either of the longitudinal or transverse members may be notched as is well known in the art. The longitudinal members between transverse members 7 and 8 are inclined as can readily be seen by reference to Figure 2, in order to provide for the stepped arrangement which enables the lowering of the center of gravity. It will be observed that the plane of the longitudinal members in the region of the fifth wheel support forward is above the plane of the longitudinal members in the region of the ground wheel support. Springs 11, secured to an axle 12 on which are supported ground wheels 13 are provided for supporting the rear of the cradle. Transverse members 14 and 15 at the forward portion of the tank support a fore and aft pin 16 on which is mounted bearing plate 17 of the fifth wheel. The bearing plate 17 is provided with a pin 18 through which the bearing plate is centered on the complementary portion of the fifth wheel carried by the towing vehicle, the ground wheel 19 of which is shown in Figure 2.

Welded to the cradle framework is a cradle sheet 20. This is made of sheet metal and forms an integral part of the cradle proper. The cradle framework and the cradle sheet, welded into an integral structure, are adapted to support the entire weight of the load thus eliminating the necessity of a frame. The cradle sheet is provided with end pieces 21 and 22. The upper end of the cradle sheet is provided with a flange 23, which extends completely therearound. In the construction shown in the drawings, a two-compartment assembly is illustrated. At a point intermediate the ends of the cradle a web plate 24 is provided as can readily be seen by reference to Figures 2 and 6. The web plate is provided at its upper edge with a flange 25 as can be seen by reference to Figures 1 and 2.

The liquid containing tanks of the assembly are made of stainless steel or the like and are supported from the cradle flange by means of end flanges. The forward liquid containing tank 26 is offset to conform with the cradle shape. The end walls of the tank are reinforced by angles 27 and T 28, welded thereto, as can readily be seen by reference to Figure 1. Welded to the vertical reinforcing members 27 and 28 is a transverse reinforcing member 29 which carries a flange 30 adapted to rest upon the flange 23 of the cradle at the forward end. To the rear bulkhead vertical reinforcing members 27 and 28, is welded a transverse reinforcing member 31 which carries a flange 32' which is supported on flange 25. Since the partition is curved and the supporting flange 25 is straight, an extension plate 32 is provided. This extension plate also serves an additional function in tying the forward tank 26 and the after tank 33 together. The flange 34 is secured to the reinforcing members 27 and 28 and the forward partition of the after tank is also secured to the plate 32 by means of bolts 35. The plate 32 extends to the cradle flange 23. It will be seen that the liquid tanks are supported from their forward and after ends by means of the flanges just described. The after end of the forward tank and the forward end of the after tank are supported by combined coupling and support a plate 32 which is in turn supported by supporting web 24 and by the cradle flanges at the sides. The interspaces between forward and after tanks is provided with a sheathing 36 as can readily be seen by reference to Figure 2. It will be observed that the tanks are thus spaced from the cradle. The spacing is filled with insulation 37 which may be rock wool, balsa wool or any other suitable insulating medium. It has been the practice to use cork as the cork was sufficiently strong to support the weight of the tank. Cork insulation however is considerably heavier than rock wool or kapok or similar insulations. The upper portions of the tanks are protected by an upper sheathing 37', which is supported from the cradle flange 23 in any suitable manner. Suitable draw-off connections 38 and 39 are provided. Manholes 40 and 41 for the respective tanks are provided. These may be of any suitable construction and provided with insulated covers 42 and 43.

It will be seen that I have accomplished the objects of my invention. I have provided a frameless trailer assembly for a trailer adapted to haul comestible liquids, in which the container for the liquids is independent of the insulation. The tanks may be made of stainless steel or any other suitable material and be readily removed for inspection, cleaning and steaming and the like. It is very essential to keep tanks for comestible liquids sanitary and clean. The weight of the assembly is reduced, enabling a larger useful load to be carried. A plurality of compartments may be readily provided at a minimum cost.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a portable tank assembly, the combination with an elongated tank enclosed by heads at its ends, of a cradle comprising a frame and a trough shaped member integrally mounted thereon, tank supports affixed to the end heads and spaced above its bottom, tank supports on the cradle positioned to correspond with the supports on the end heads and adapted to furnish a hanging support and hold the tank in spaced relation with the trough, a sheathing enclosing the upper part of the tank and positioned to form an annular space therebetween, and insulating material in the interspaces between the tank and the trough and the tank and the sheathing.

2. In a portable tank assembly, the combination with a plurality of elongated tanks enclosed by heads at their ends, of a cradle comprising a frame and a trough shaped member integrally mounted thereon, tank supports affixed to the end heads of the tanks and spaced above their bottoms, tank supports on the cradle positioned to correspond with the supports on the end heads and adapted to furnish hanging supports and hold the tanks in spaced relation with the trough, a sheathing enclosing the upper part of the tanks and positioned to form an annular space therebetween, and insulating material in the interspaces between the tanks and the trough and the tanks and the sheathing.

3. A portable tank assembly as in claim 1 in which the supporting means at the extremities of the tank are positioned substantially midway the height of the tank.

RALPH A. BRADLEY.